Jan. 20, 1942.   R. B. HENNING   2,270,296
PIPE COUPLING
Filed May 6, 1940

INVENTOR.
RALPH B. HENNING
BY Whittemore, Hulbert
+ Belknap ATTORNEYS

Patented Jan. 20, 1942

2,270,296

UNITED STATES PATENT OFFICE 2,270,296

PIPE COUPLING

Ralph B. Henning, Alpena, Mich.

Application May 6, 1940, Serial No. 333,658

2 Claims. (Cl. 285—112)

The present invention relates to pipe coupling and more particularly to a pipe coupling suitable for connecting together sections of fiber-cement pipes, such for example as are sold under the trade name of Transite.

According to the present invention fiber-cement pipes are provided with metallic flange coupling units which are secured thereto by means of a ring of yieldable material which serves as a sealing medium and also as a locking means for retaining the flange coupling units in position at the ends of the pipe sections.

It is an object of the present invention to provide fiber-cement pipes with metallic flange couplings.

It is a further object of the invention to provide fiber-cement pipes with metallic flange coupling units secured thereon by means of a flexible locking and sealing ring.

It is a further object of the invention to provide a fiber-cement pipe with a metallic flange coupling unit in which the flange coupling unit is provided with a sleeve received over the end of the fiber-cement pipe and in which cooperating channels are provided at the exterior of the pipe and in the interior of the sleeve in registry, said channels being filled with a yieldable material serving as a sealing and locking means.

Other objects of the invention will be apparent as the description proceeds and when taken in conjunction with the accompanying drawing wherein.

Figure 1:
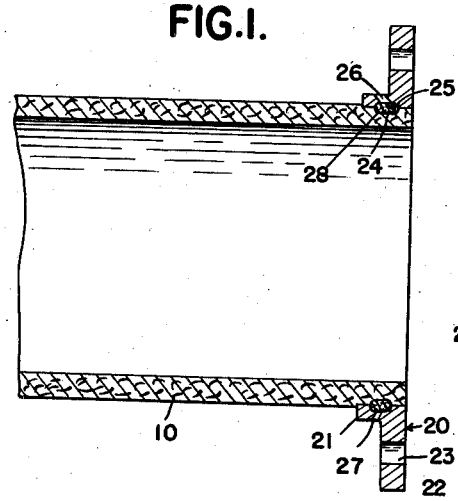
Figure 1 is a longitudinal fragmentary section illustrating a preferred form of pipe coupling.
Figure 2:
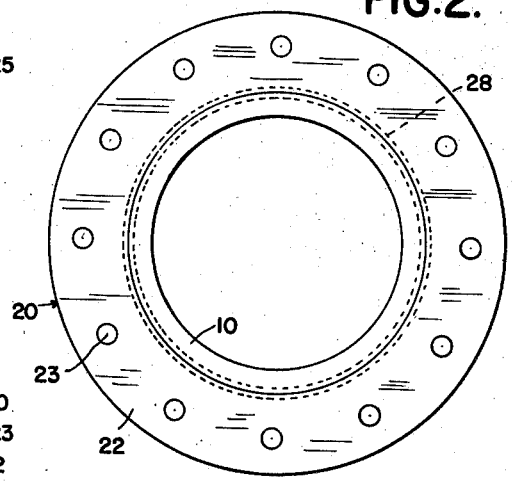
Figure 2 is an end elevation of the coupling shown in Figure 1.

Referring first to Figures 1 and 2, I have illustrated an end portion of a fiber-cement pipe 10. Pipes of this type may be made of various materials, and a well-known example is a pipe sold under the trade name of Transite, which is formed of asbestos fiber and cement. Pipes of this nature have numerous well known advantages, among which is the ability to resist corrosive action, and it is an object of the present invention to provide this type of pipe with a metallic flange coupling, whereby sections of the pipe of this material may be joined together, or to elbows or the like, by conventional metal flanges.

In Figure 1 I have illustrated a flanged sleeve which comprises a sleeve 21 and a radially extending flange 22 formed integrally therewith. The flange 22 is in turn provided with bolt holes 23 by means of which it is adapted to be bolted to flange coupling units of adjacent pipe sections. In Figure 1 I have indicated the end of the pipe 10 as of slightly reduced diameter for the reception of the sleeve portion 21. It is unnecessary that the pipe be of reduced diameter at this point, but I have found it convenient to finish the end of the pipe accurately so as to insure close fit with the sleeve 21. In addition the pipe 10 is provided adjacent its end but spaced slightly therefrom with a shallow channel 24. The sleeve 21 of the flange coupling unit 20 is provided with a correspondingly dimensioned channel 25 which is adapted to register with the channel 24 formed exteriorly on the pipe. Channels 24 and 25, as will be evident from Figure 1, cooperate to form an annular chamber. I provide a generally radially extending opening 26 through the sleeve 21 which communicates with the channel 25 formed in the interior of the sleeve 21. Also I prefer to provide a second opening 27 which extends radially through the sleeve 21 and communicates with the channel 25.

To assemble the parts, the flange coupling unit 20 is placed over the end of the pipe 10 so that the channels 24 and 25 are in registry. A suitable sealing and locking material, as indicated at 28, is then introduced through the opening 26 under pressure so as to fill the annular chamber provided with the registering channels 24 and 25. The opening 27 serves as an air vent during this filling operation, and also serves as a telltale which will indicate when the chamber has been completely filled.

While a number of various materials may be employed as the sealing and locking material I prefer to employ litharge, which I have found to be entirely satisfactory for this purpose. This material may be introduced in a plastic condition under pressure through the opening 26 in a manner to completely fill and seal the chamber referred to. As an alternative, suitable rubber compounds may be employed, but it will be apparent that the material must be such as to enable it to be introduced in plastic condition. It may afterwards set, and will preferably have sufficient body to serve the function of interlocking the pipe 10 and the sleeve 21 together.

Figure 3:
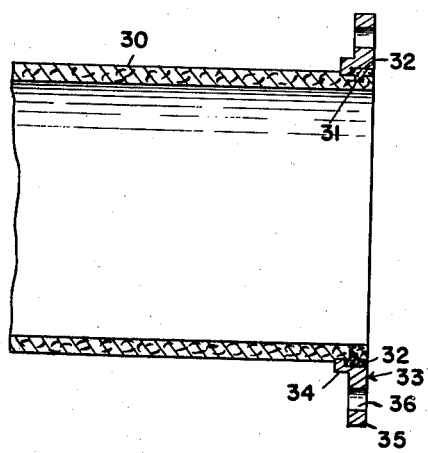
Figure 3 is a fragmentary longitudinal section of another preferred form of pipe coupling.
Figure 4:
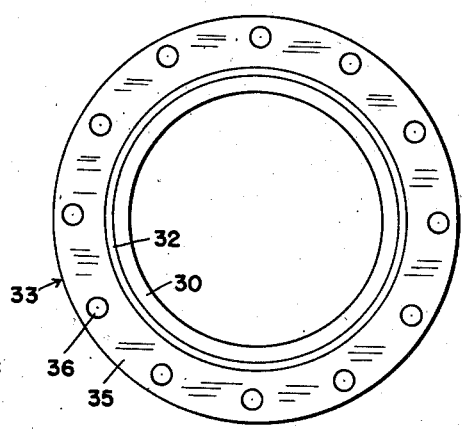
Figure 4 is an end view of the coupling shown in Figure 3.

Referring now to Figure 3, I have illustrated a slightly different embodiment of my invention, in which the pipe 30 is provided adjacent its end with an external annular groove or channel 31 for the reception of a suitable sealing and locking compound 32. In this case the flange coupling unit is indicated generally at 33 and comprises a sleeve portion 34 and an integral radially extending flange portion 35 provided with a plurality of bolt holes 36.

The sleeve portion 34 is provided at its interior with a channel 37 which is adapted to register generally with the channel 31. In this case no radial openings need be provided through the sleeve for the introduction of the plastic sealing material, since this may be introduced from the end of the pipe, as will be evident in Figure 3.

I have found that pipes provided with metallic flange couplings of this type, in the manner specified, serve efficiently under exacting servicing conditions. In addition the coupling means may be provided economically and greatly facilitates the interconnection of adjacent pipe sections.

While I have illustrated two preferred embodiments of my improved pipe coupling, it is to be understood that the same has been done to enable those skilled in the art to practice the invention, the scope of which is indicated by the appended claims.

What I claim as my invention is:

1. A new article of manufacture comprising, in combination, a fiber-cement pipe section, metal couplings permanently secured to the ends of said pipe section for attachment to adjacent pipe sections or standard fittings, said couplings comprising metal sleeves surrounding the ends of said pipe sections and permanently sealed thereto, and integral, radially extending standard metal coupling flanges on the outer ends of said sleeves.

2. A new article of manufacture comprising, in combination, a fiber-cement pipe section, metal couplings permanently secured to the ends of said pipe section for attachment to adjacent pipe sections or standard fittings, said couplings comprising metal sleeves surrounding the ends of said pipe sections and permanently sealed thereto, and integral, radially extending standard metal coupling flanges on the outer ends of said sleeves, the inner surface of said metal sleeves and the outer surface of said fiber-cement pipe section adjacent its ends having cooperating annular recesses providing an annular chamber, and a sealing material substantially filling said chamber and permanently interlocking said pipe section and couplings.

RALPH B. HENNING.